(12) United States Patent
Rousseau et al.

(10) Patent No.: US 10,589,711 B2
(45) Date of Patent: Mar. 17, 2020

(54) SEATBELT PRETENSIONER SHIELD AND HEAT ENERGY DISSIPATOR

(71) Applicant: GM Global Technology Operations LLC, Detroit, MI (US)

(72) Inventors: Ingrid A. Rousseau, Clawson, MI (US); Megan E. McGovern, Royal Oak, MI (US); Teresa J. Rinker, Royal Oak, MI (US); Jeffrey J. Calderas, Royal Oak, MI (US); Kestutis Sonta, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 172 days.

(21) Appl. No.: 15/952,884

(22) Filed: Apr. 13, 2018

(65) Prior Publication Data

US 2019/0315308 A1 Oct. 17, 2019

(51) Int. Cl.
*B60R 22/195* (2006.01)
*B01D 39/20* (2006.01)
*B01D 46/24* (2006.01)

(52) U.S. Cl.
CPC ...... *B60R 22/1954* (2013.01); *B01D 39/2093* (2013.01); *B01D 46/2418* (2013.01); *B60R 22/1951* (2013.01); *B01D 2279/00* (2013.01); *B01D 2279/10* (2013.01); *B60Y 2410/10* (2013.01); *B60Y 2410/114* (2013.01)

(58) Field of Classification Search
CPC . B60R 22/1954; B60R 22/1951; B60R 22/22; B01D 46/2418; B01D 39/2093; B01D 2279/10; B01D 2279/00; B60Y 2410/114; B60Y 2410/10
See application file for complete search history.

(56) References Cited

U.S. PATENT DOCUMENTS

| 6,340,176 | B1 * | 1/2002 | Webber | B60R 22/1952 280/805 |
|---|---|---|---|---|
| 7,500,632 | B2 * | 3/2009 | Ono | B60R 22/4633 242/374 |
| 10,369,962 | B2 * | 8/2019 | Faruque | F16F 9/006 |
| 2011/0140501 | A1 * | 6/2011 | Shiotani | B60R 22/4628 297/474 |
| 2012/0013111 | A1 * | 1/2012 | Nagata | B60R 22/4633 280/806 |
| 2014/0102329 | A1 * | 4/2014 | Yang | B60R 22/4633 102/530 |

* cited by examiner

*Primary Examiner* — Drew J Brown
(74) *Attorney, Agent, or Firm* — Quinn IP Law (57) ABSTRACT

A lap belt pretensioner for a lap belt configured to secure an occupant of a vehicle seat includes a pyrotechnic device. The pyrotechnic device is configured to generate a force directed to tension the lap belt around the occupant and emit an exhaust gas including particulates at high pressure and high temperature as a byproduct of the generated force. The lap belt pretensioner also includes a housing configured to retain the pyrotechnic device and defining an exhaust passage configured to expel the exhaust gas from the lap belt pretensioner. The lap belt pretensioner additionally includes a shield arranged over the exhaust passage and configured to collect and/or deflect the emitted particulates and dissipate heat energy thereof. A vehicle having the vehicle seat mounted to the vehicle structure and employing the seatbelt system is also provided.

20 Claims, 7 Drawing Sheets

SEATBELT PRETENSIONER SHIELD AND HEAT ENERGY DISSIPATOR

INTRODUCTION

The present disclosure relates to a shield and heat energy dissipator for a seatbelt pretensioner.

Vehicles are typically provided with seats designed to accommodate the operator and passenger(s) inside the vehicle. Frequently, such seats are adjustable fore-aft relative to the vehicle structure, as well as being able to recline in order to enhance passenger comfort and be moved out of the way to generate useful space for transporting cargo.

Most vehicle seats work together with seatbelts configured to restrain the vehicle's operator and passengers. Typically, seatbelts are configured as flexible bands or straps and employ buckles to fasten two ends of the seatbelt around the vehicle occupant. In some vehicles, seatbelts are attached directly to the vehicle body structure, while in other vehicles seatbelts are incorporated into structures of the seats.

Seatbelts are generally designed to reduce a vehicle occupant's motion by securely positioning the occupant in the seat. Seatbelts are additionally designed to absorb energy by tightening during sudden deceleration to reduce a speed differential between the passenger's body and the vehicle interior. Seatbelts in modern vehicles are typically equipped with pretensioners. Pretensioners are generally designed to preemptively tighten the seatbelt to secure the occupant inside the vehicle against unintended movement, especially during sudden, intended or unintended, maneuvers of the vehicle. Pretensioners frequently incorporate pyrotechnic devices using rapidly expanding high temperature gas to promptly retract the seatbelt.

SUMMARY

A lap belt pretensioner is disclosed for a lap belt configured to secure an occupant of a vehicle seat. The lap belt pretensioner is configured to pull and secure the lap belt around the occupant. The lap belt pretensioner includes a pyrotechnic device configured to generate a force directed to tension the lap belt around the occupant and emit an exhaust gas including particulates at high pressure and high temperature as a byproduct of the generated force. The lap belt pretensioner also includes a housing configured to retain the pyrotechnic device and defining an exhaust passage configured to expel the exhaust gas from the lap belt pretensioner. The lap belt pretensioner additionally includes a shield arranged over the exhaust passage and configured to collect and/or deflect the emitted particulates and dissipate heat energy thereof.

The shield may include a mesh structure having a plurality of openings configured to block or stop the particulates from exiting the exhaust passage. The plurality of openings may be additionally configured to permit the emitted exhaust gas to escape the exhaust passage.

The mesh structure may be fixed to the housing.

The mesh structure may include a compliant first mesh member fixed to the housing and a second rigid mesh member spaced apart from the first mesh member, and wherein the first mesh member is configured to block the emitted particulates and the second mesh member is configured to limit or contain movement of the first mesh member away from the housing.

The mesh structure may be pivotably connected to the housing and configured to move under the high pressure generated by the pyrotechnic device.

The mesh structure may be arranged on and connected to the housing and configured to detach under the high pressure generated by the pyrotechnic device.

The mesh structure may be arranged on and fixed to the housing. In such an embodiment, the mesh structure may be additionally constructed from a shape-memory alloy configured to decrease the size of each of the plurality of openings in response to the heat energy of the particulates.

The mesh structure may be arranged on and fixed to the housing. In such an embodiment, the mesh structure may additionally include auxetic properties facilitating the mesh structure to extend away from the exhaust passage under the high pressure generated by the pyrotechnic device, while maintaining a respective size of each of the plurality of openings to capture the particulates.

The mesh structure may include an open-cell ceramic foam filter mounted to the housing via a ceramic foam filter holder.

The mesh structure may include either a wall-flow ceramic structure or a flow-through ceramic structure mounted to the housing via a ceramic structure holder.

A vehicle having the disclosed lap belt pretensioner as part of a seatbelt system is also provided.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
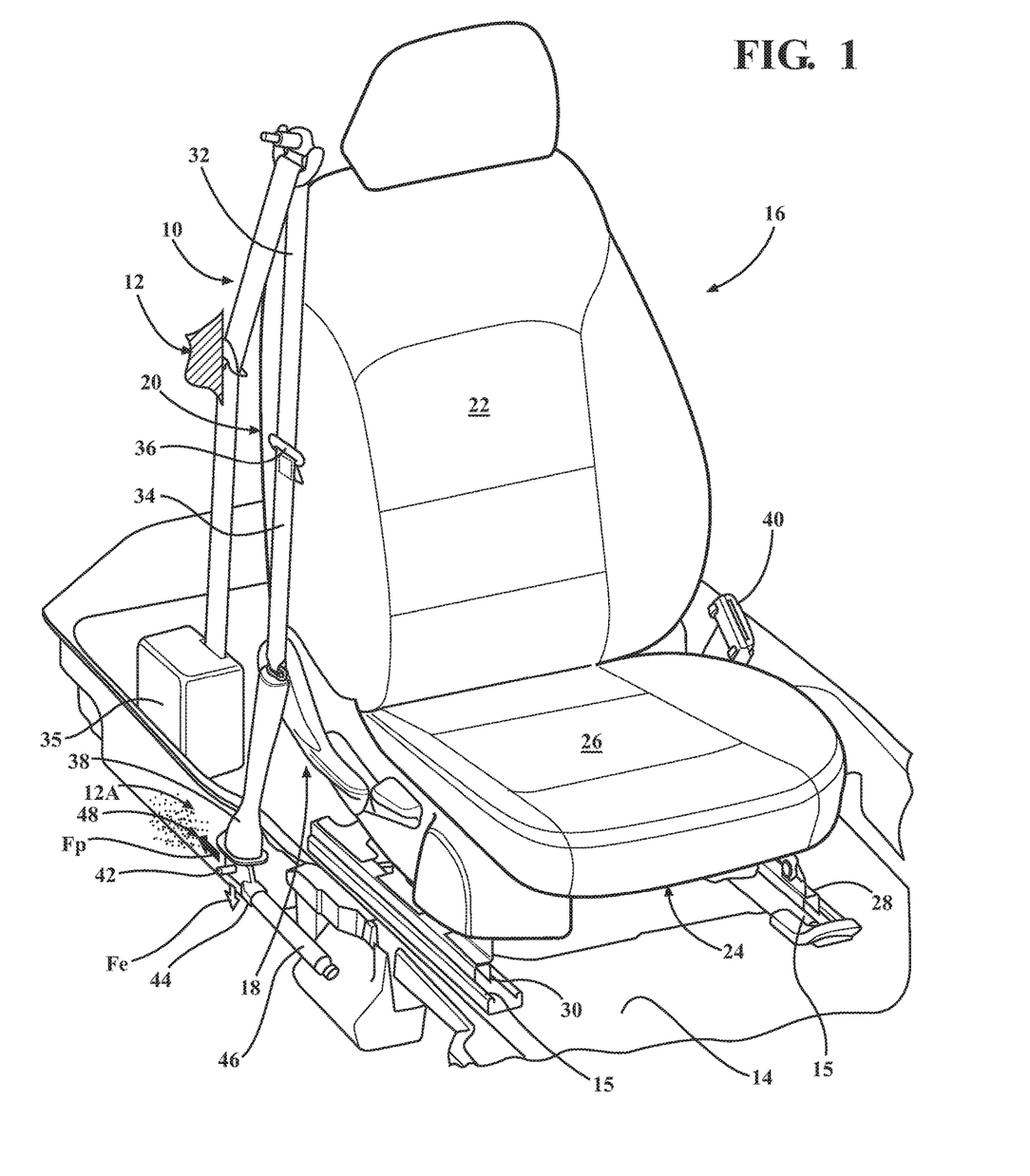
FIG. 1 is a perspective view of a seatbelt system for a vehicle seat and having a lap belt pretensioner having a pyrotechnic device configured to tension the lap belt around a vehicle occupant and a shield configured to collect and/or deflect pyrotechnic device particulates.

Referring to the drawings, wherein like reference numbers refer to like components, FIG. 1 shows a perspective view of a seatbelt system 10 positioned inside, i.e., within an interior of, a vehicle 12. The seatbelt system 10 is operatively connected to a vehicle structure 14, which may include individual seat rails 15, as shown. The seatbelt system 10 includes a vehicle seat 16 positioned inside the vehicle 12 and operatively connected to the vehicle structure 14. The seat 16 includes a seat frame 18. The seat frame 18 includes a first seat structure 20 that is configured to support a seatback 22. The seat frame 18 also includes a second seat structure 24 that is configured to support a cushion 26. The first seat structure 20 is pivotably attached to the second seat structure 24 to accommodate an occupant (not shown) of the vehicle seat 16. The second seat structure 24 includes a first track 28 and a second track 30. As shown, the seat 16 may be slidably attached to the vehicle structure 14 via the first track 28 and the second track 30.

The seatbelt system 10 is configured to provide a safety restraint for the occupant of the vehicle seat 16. The seatbelt system 10 includes a shoulder belt 32 and a lap belt 34 configured to secure the occupant in the vehicle seat 16. Specifically, the shoulder belt 32 is configured to be worn around the torso of the occupant of the seat 16, while the lap belt 34 is configured to be worn around the occupant's waist. The shoulder belt 32 is connected to a retractor-pretensioner 35 configured to tighten the shoulder belt around the seat occupant. The lap belt 34 includes a first end 36 and a second end 38. The first end 36 is configured to be connected to a buckle 40 and the second end 38 is connected to an anchor 42. The seatbelt system 10 also includes a lap belt pretensioner 44, a.k.a., lap pretensioner (LPT) operatively connected to the lap belt 34. The LPT 44 may be mounted to the vehicle structure 14, as shown in FIG. 1, or to the seat frame 18 (not shown). The LPT 44 is specifically configured to tension the lap belt 34 and secure the occupant relative to the vehicle seat 16 against sudden movement inside the vehicle 12, such as during intended or unintended maneuvers of the vehicle.

As shown in FIG. 1, the LPT 44 includes a pyrotechnic device 46. Upon its activation and deployment, the LPT 44 generates a force Fe directed to tighten the lap belt 34 around the occupant. As a byproduct of the generated force Fe, the pyrotechnic device 46 emits a highly pressurized exhaust gas that may reach speeds as high as 500 m/s and at temperatures up to 400 degrees C. The emitted exhaust gas may include particulates 48 and exerts a force Fp in a direction generally counter to the force Fe. The LPT 44 also includes a housing 50 configured to retain the pyrotechnic device 46. The housing 50 defines an exhaust passage 52 configured to expel the exhaust gas along with particulates 48 from the LPT 44. The LPT 44 additionally includes a shield or cover 54. The shield 54 is arranged over, i.e., at the exit of, the exhaust passage 52 and configured to collect, deflect, and/or redirect the particulates 48 from a direct line of action $L_a$ and thus trap or change a trajectory of the particulates. By thus collecting, deflecting, and/or redirecting the particulates 48, the shield 54 is configured to dissipate heat energy of the particulates 48 and prevent hot particulates from impinging on a nearby component 12A within the interior of the vehicle 12. As shown in FIG. 1, such a component 12A may, for example, be a section of the vehicle's carpeting and/or sound insulation.

Figure 2:
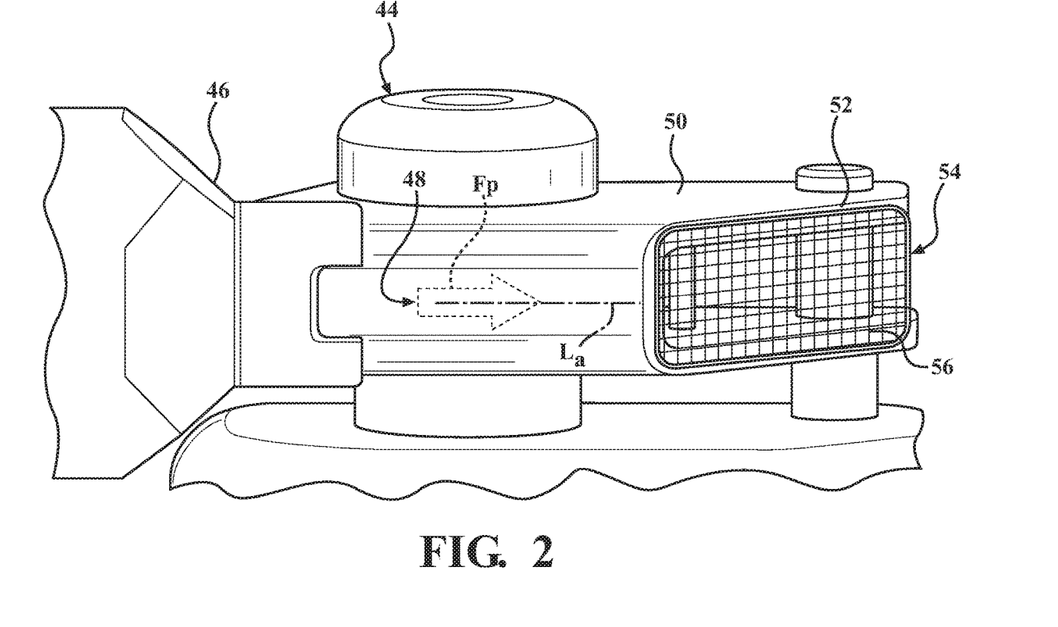
FIG. 2 is a close-up perspective view of a specific embodiment of the pyrotechnic device shield shown in FIG. 1 and having a mesh structure.

FIG. 2 depicts a rotated up-close image of the LPT 44. As shown in FIG. 2, the shield 54 includes a mesh structure generally designated via numeral 56. The mesh structure 56 may be mechanically fixed to the housing 50. The mesh structure 56 may be attached to the housing 50, for example, via adhesive bonding, mechanical fastening (e.g., bolting, screwing, hooking, riveting), or welding (e.g., ultrasonic welding, spot welding, arc welding, or the like). The method of attachment of the mesh structure 56 to the housing 50 may be dictated by specific mesh function as described in detail below. Lower force or non-permanent joining methods may be used to allow detachment of the mesh structure 56 from the housing 50 during activation of the LPT 44, as required by certain embodiments described below. In contrast, higher force or more permanent joining methods may be used to ensure retention of the mesh structure 56 to the housing 50 during activation of the LPT 44.

Figure 2A:
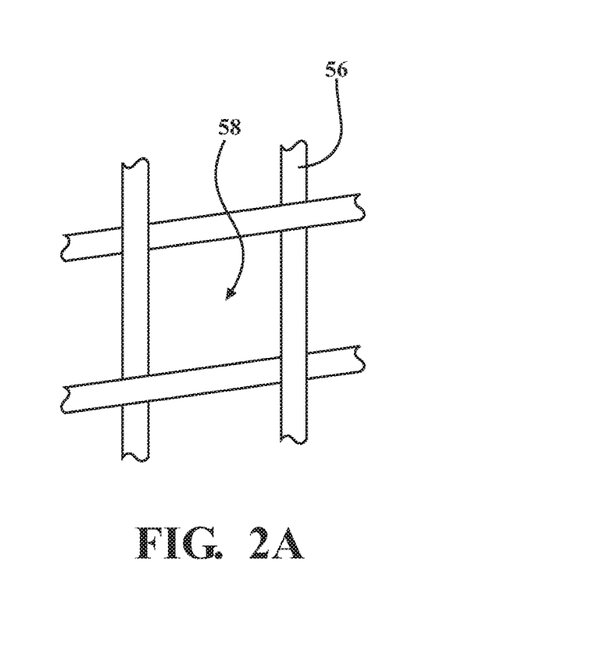
FIG. 2A is a close-up view of the mesh structure shown in FIG. 2.

A number of embodiments of the mesh structure 56 are envisioned and will be described in detail below. While the contemplated embodiments of the mesh structure 56 may vary in form, construction, attachment, and material, each of the mesh structure 56 embodiments includes a plurality of openings 58, shown up-close in FIG. 2A. The openings 58 are configured to block the particulates 48 from exiting the exhaust passage 52, while permitting the emitted high-pressure exhaust gas to escape the exhaust passage 52. The size of the particulates 48 may be in a range of 0.5-3.0 mm, while the size of the openings 58 may be smaller than 1.0 mm, and, in certain embodiments, smaller than 0.5 mm. Accordingly, the smaller size of the openings 58 relative to the size of the particulates 48 permits the selective emission of exhaust, i.e., the pressure, but not the particulates, from the pyrotechnic device 46 through the mesh structure 56, thus protecting the component 12A from impingement by the particulates. Additionally, some embodiments of the mesh structure 56 are configured to protect the component 12A from being directly impinged by the high heat of the exhaust gas.

Figure 3:
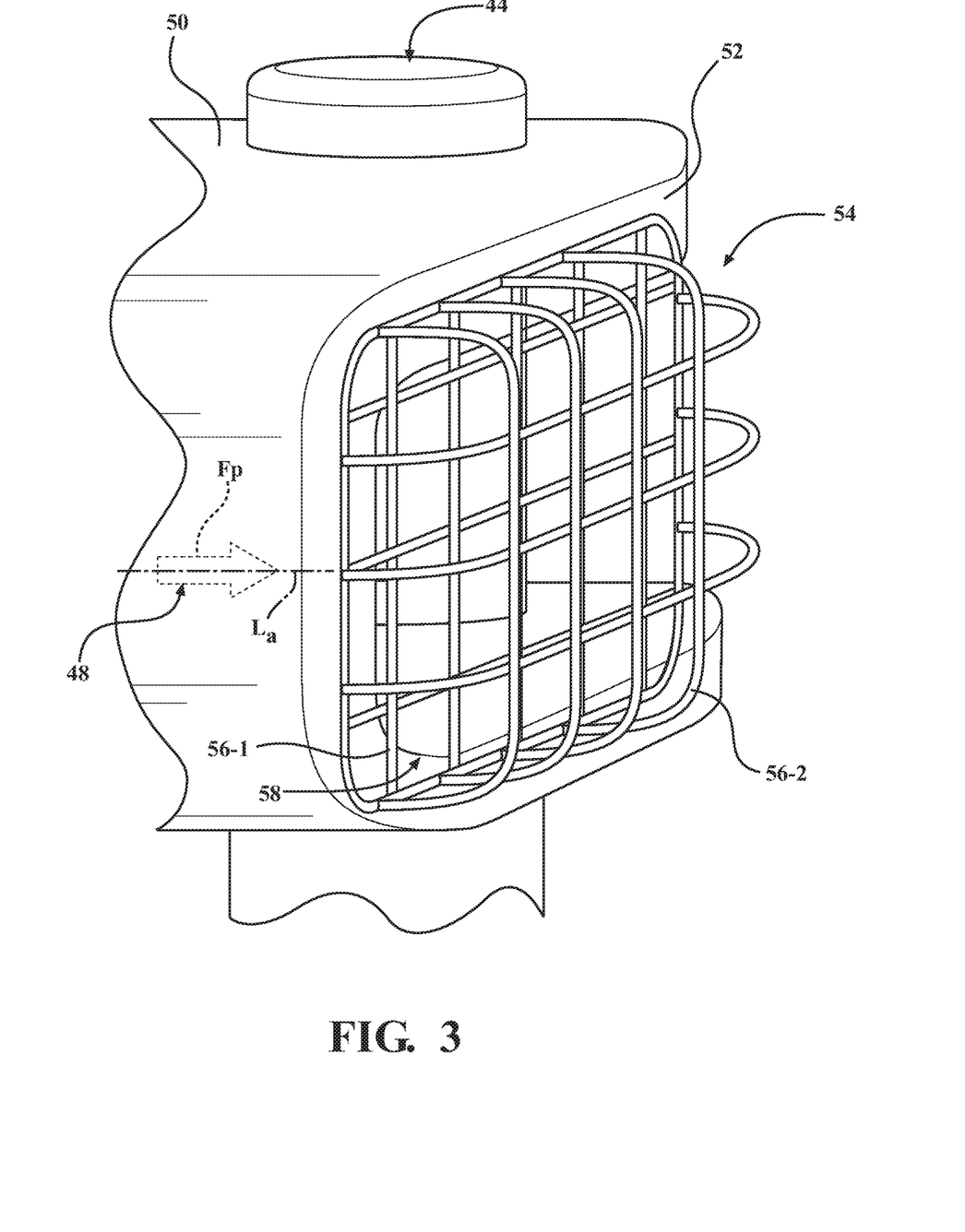
FIG. 3 is a close-up side view of another embodiment of the pyrotechnic device shield shown in FIG. 1.

In a particular embodiment of the mesh structure 56 shown in FIG. 3, the mesh structure may include a compliant first mesh member 56-1 fixed to the housing 50 and a second rigid mesh member 56-2 spaced apart from the first mesh member. In such an embodiment, the first mesh member 56-1 may be configured to block the emitted particulates 48 and the second mesh member 56-2 may be configured to limit or contain the movement of the first mesh member away from the housing 50 to secure a minimum predetermined distance between the exhaust passage 52 and a specific nearby component 12A. Specifically, the compliant first mesh member 56-1 may deflect, i.e., bend or stretch out of the way, under the force Fp of the emitted particulates 48 and largely absorb the force Fp, while the rigid second mesh member 56-2 may control the extent of the first mesh member's deflection.

Figure 4:
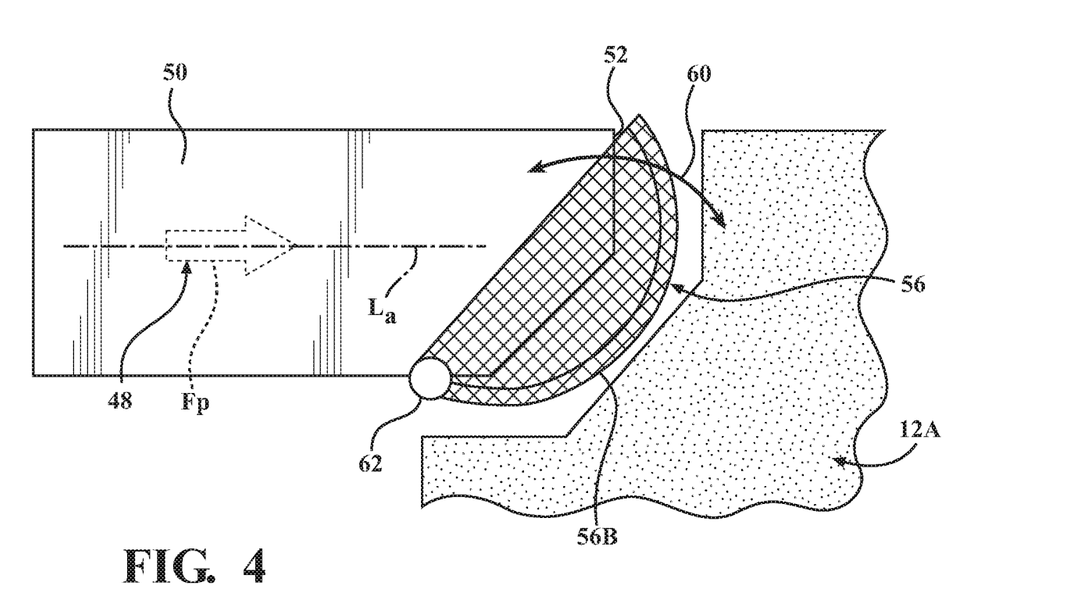
FIG. 4 is a close-view of yet another embodiment of the pyrotechnic device shield shown in FIG. 1.

Each of the first mesh member 56-1 and the second mesh member 56-2 may be constructed from metal and may be coated with a temperature resistant polymer. Alternatively, the first mesh member 56-1 may be formed from a specially engineered polymer, a tight-weave glass fabric, or other appropriate heat resistant material. In a separate embodiment, shown in FIG. 4, the mesh structure 56 may be pivotably connected to the housing 50. In such an embodiment, the mesh structure 56 would be configured to move, i.e., pivot (as designated via numeral 60), under the pressure generated by the pyrotechnic device 46 and the force Fp such as via a hinge 62. In the embodiment of FIG. 4, the mesh structure 56 may be configured as a tight-weave metal structure 56B configured to trap the particulates 48 and swing out while containing at least some of the emitted particulates. Alternatively, the mesh structure 56 may be configured from a more flexible mesh structure mounted to a rigid frame, such that the frame holds the mesh and pivots as designated via the numeral 60 about the hinge 62.

Figure 5:
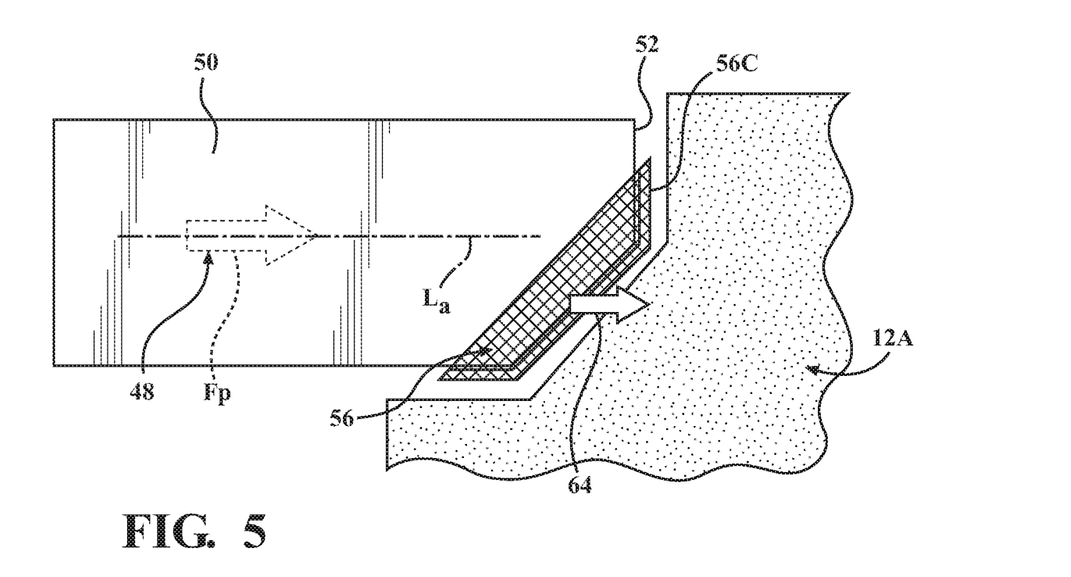
FIG. 5 is a close-up plan view of still another embodiment of the pyrotechnic device shield shown in FIG. 1.

In yet another embodiment shown in FIG. 5, the mesh structure 56 may be arranged on and be temporarily connected, mounted, or bonded to the housing 50. In such an embodiment, the mesh structure 56 may be configured to detach (as designated via numeral 64) under the pressure generated by the pyrotechnic device 46 and the force Fp. The mesh structure 56 shown in FIG. 5 may include a temperature resistant tight-weave glass fabric 56C configured to trap the particulates 48. In other words, the glass fabric 56C would be configured to withstand the temperature of the particulates 48, and the tight-weave would enable the pressure at the exhaust passage 52 to exert sufficient force to detach the mesh structure 56 from the LPT 44, while filtering exhausted particulates 48. The tight-weave glass fabric 56C may define voids smaller than 0.5 mm, and, further, smaller than for example greater than 0.1 mm. The embodiments of the mesh structure 56 shown in FIGS. 2-5 may be constructed from a variety of materials suitable for the high temperature and pressure environment described herein. Such materials, without limitation, may include appropriate high strength polymers or composites, such as high-strength plastic, Kevlar, Aramide, and PET, bare or nylon coated glass, or bare or coated metal wire.

Figure 6:
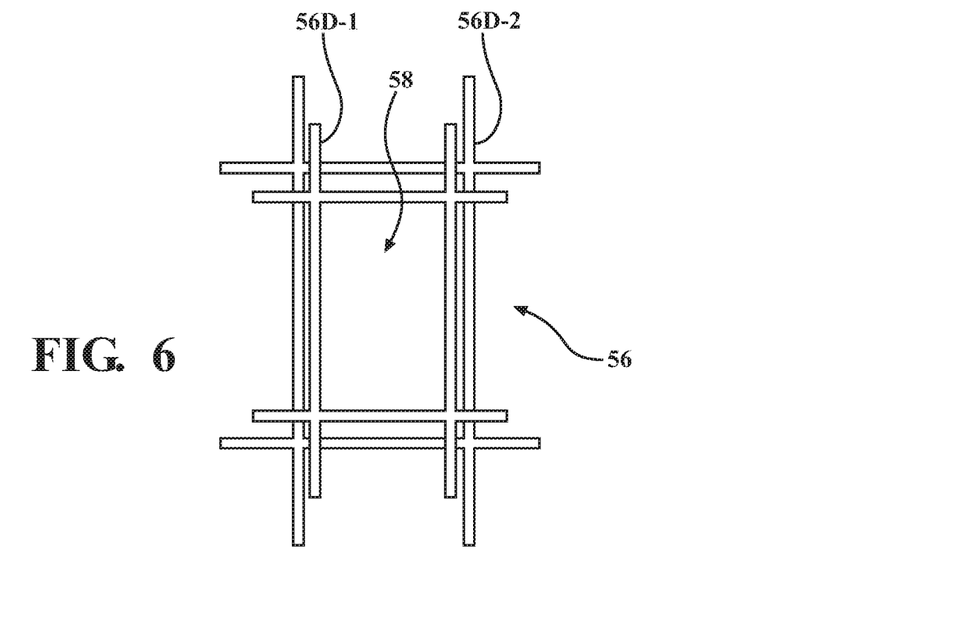
FIG. 6 is a close-up view of yet another embodiment of the pyrotechnic device shield shown in FIG. 1.

In a separate embodiment of the mesh structure 56 shown in FIG. 6, the mesh structure may be arranged on and fixed to the housing 50 (similar to the housing shown in FIGS. 2-5). The mesh structure 56 of FIG. 6 may be loosely attached to the housing 50 and constructed from wires made from a shape-memory alloy configured to decrease a respective size of each of the plurality of openings 58 in response or due to the heat energy emitted by the pyrotechnic device 46. In general, a shape-memory alloy or SMA is an alloy that "remembers" its original shape 56D-1 and which, after having been deformed to shape 56D-2, when heated, returns to its pre-deformed shape 56D-1. In other words, the SMA 56D wires will shorten when impinged on by the emitted high temperature exhaust gases of the LPT 44. In response, the openings 58 of the shape 56D-2 of the SMA 56D would shrink and trap the particulates 48 within the shape 56D-1 of the mesh structure 56. The SMA 56D wires may be intertwined and/or welded to one another to maintain the general shape of the mesh structure 56.

Figure 7:
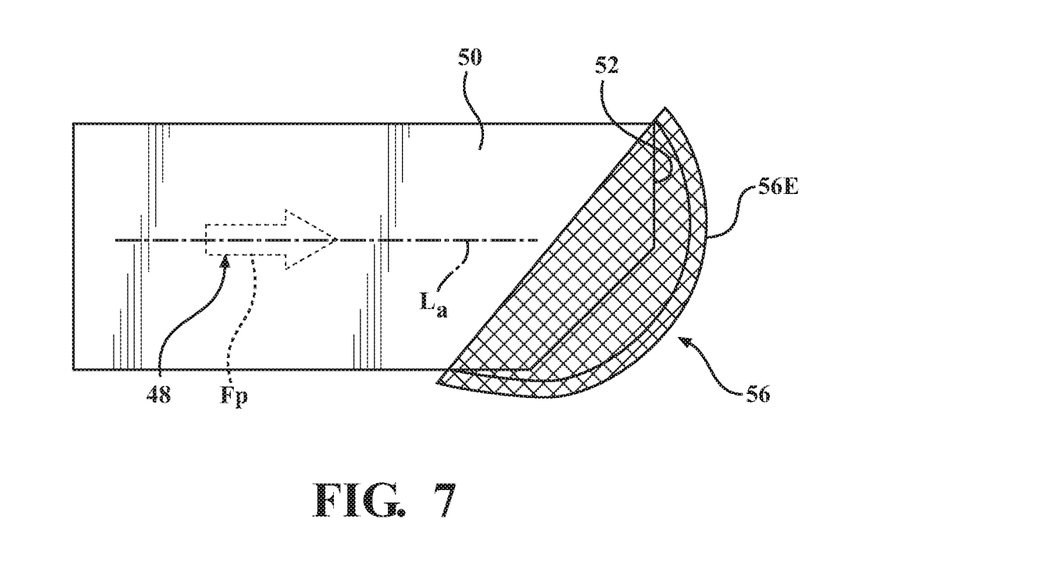
FIG. 7 is a close-up view of still another embodiment of the pyrotechnic device shield shown in FIG. 1.
Figure 7A:
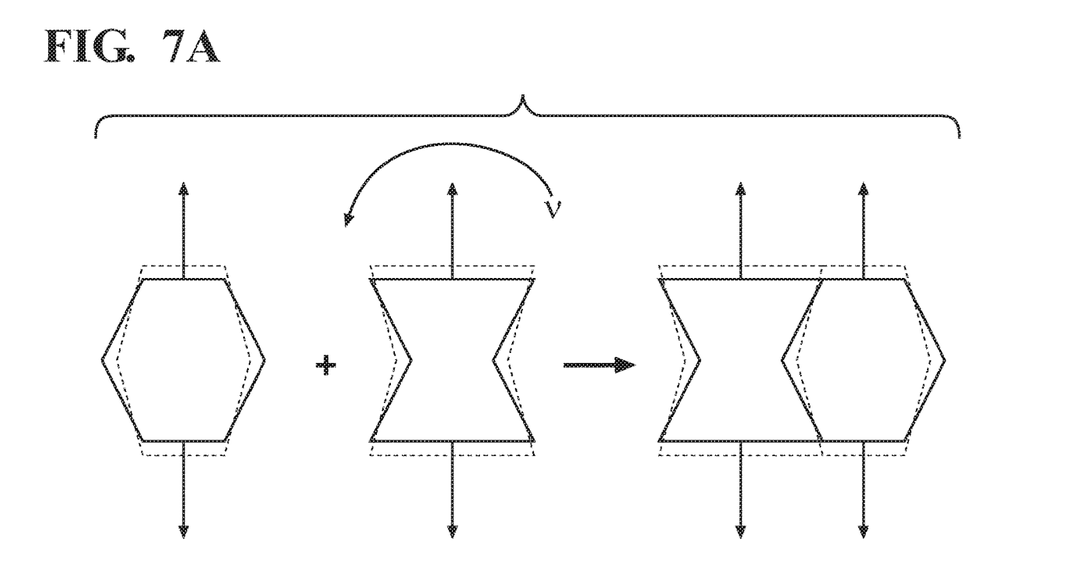
FIG. 7A is a depiction of auxetic property of the pyrotechnic device shield shown in FIG. 7.

In another embodiment of the mesh structure 56, shown in FIG. 7, the mesh structure may be arranged on and fixed to the housing 50. In the embodiment of FIG. 7, the mesh structure 56 includes a mesh 56E having auxetic properties. In general, auxetic structures and/or materials have a negative Poisson's ratio "v", i.e., a ratio of transverse strain to axial strain, which is for small values of these changes, is the amount of transversal expansion divided by the amount of axial compression (shown in FIG. 7A). When stretched, these structures and materials become thicker perpendicular to the applied force. Such a change occurs mainly because of the specific internal structure and the way the subject structure deforms when it is uniaxially loaded. Such materials and structures generally have advantageous mechanical properties, such as high energy absorption and fracture resistance. The auxetic properties of the mesh 56E facilitate or permit the mesh to extend away from the exhaust passage 52 under the pressure and force Fp generated by the pyrotechnic device 46, while maintaining its general integrity and a respective size of each of the plurality of openings 58 to capture or trap the particulates 48.

Figure 8:
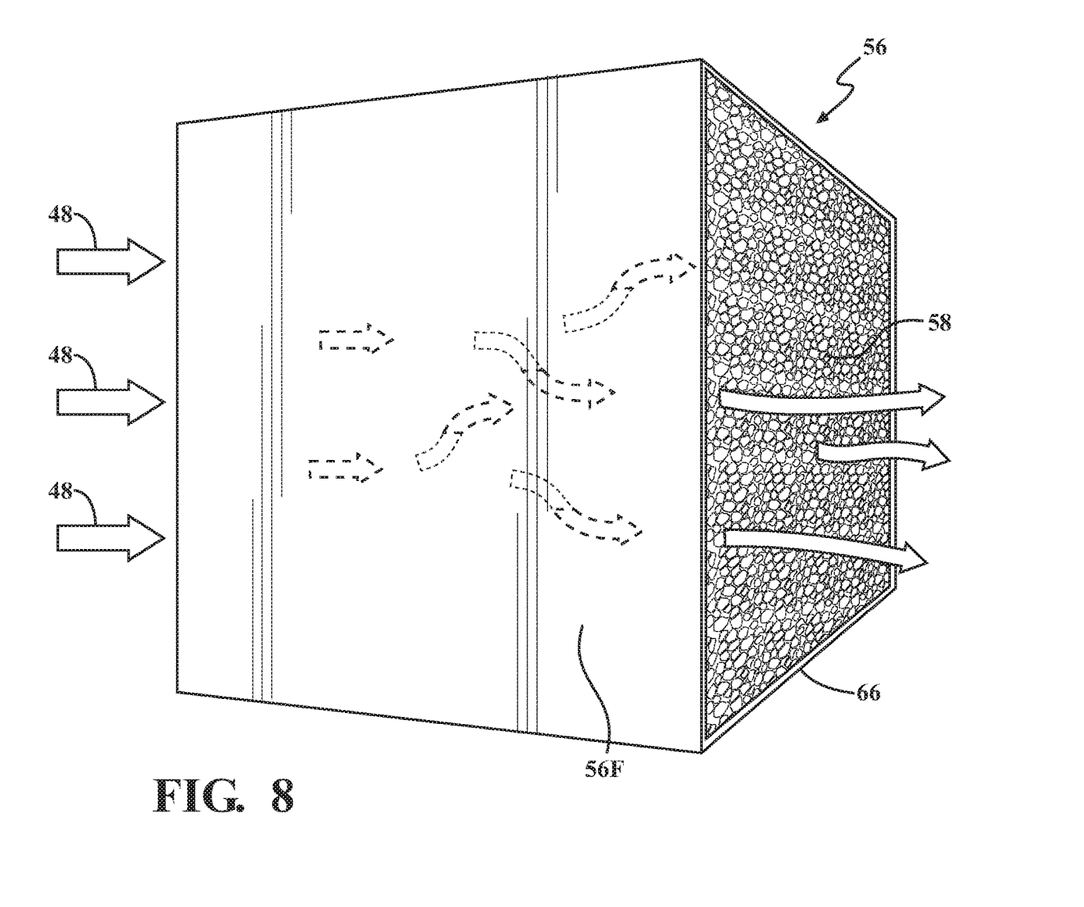
FIG. 8 is a close-up perspective view of one open-cell ceramic foam filter embodiment of the pyrotechnic device shield shown in FIG. 1.

In yet another embodiment shown in FIG. 8, the mesh structure 56 may include an open-cell ceramic foam filter 56F mounted to the housing 50 via a ceramic structure holder or frame 66. Open-cell ceramic foam filter 56F uses irregular convoluted pathways through the mesh structure 56. Particulates 48 are filtered out or trapped by varying size and convolutions in the pathways as the exhaust gas travels through the open-cell ceramic foam 56F. Heat is additionally dissipated via open-cell ceramic foam filter 56F as the hot exhaust gas flows from one side of the open-cell ceramic foam filter 56F to the other. Generally, ceramic foam is a tough foam made from ceramic materials. Such ceramic foams are typically manufactured by impregnating open-cell polymer foams internally with a ceramic slurry and then firing the resultant arrangement of materials in a kiln, leaving only ceramic material. Such foams may include various ceramic materials, such as aluminum oxide, a high-temperature ceramic, and obtains its thermal, pollution, and acoustic insulating properties from a multitude of air-filled voids within the remaining material.

Figure 9:
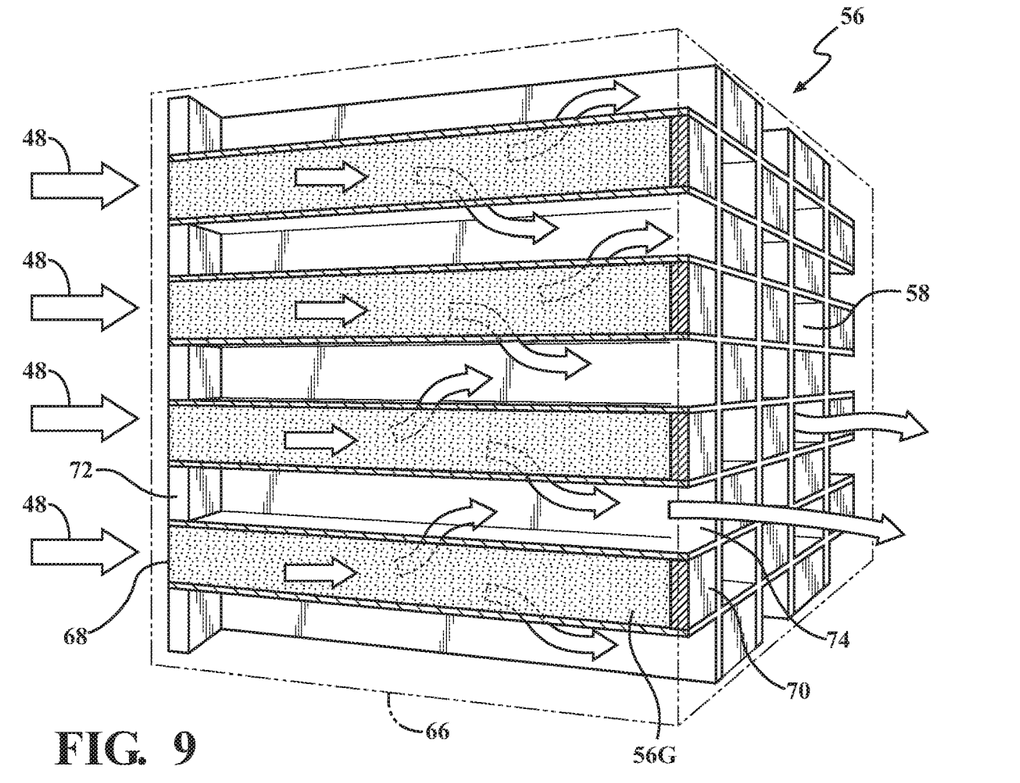
FIG. 9 is a close-up perspective view of a wall-flow ceramic filter embodiment of the pyrotechnic device shield shown in FIG. 1.

In an embodiment shown in FIG. 9, the mesh structure 56 may include a wall-flow ceramic filter structure 56G mounted to the housing 50 via the ceramic structure holder or frame 66. In the wall-flow ceramic filter 56G the exhaust gas from the LPT 44 passes through side walls bounding the mesh structure 56, and flows into and through channels to the ambient, while particulates 48 are trapped in the channels that are blocked at their ends. The wall-flow ceramic filter 56G may include alternating channels with unblocked entrances 68 and blocked exits 70 and channels with blocked entrances 72 and unblocked exits 74, as shown in FIG. 9. In the wall-flow ceramic filter structure 56G, the exhaust gas from the LPT 44 enters through the channels with unblocked entrances 68 and passes through channel side walls to enter adjacent channels with unblocked exits 74 where it then exits to the ambient. Particulates 48 that enter the wall-flow ceramic filter 56G will be trapped in the channels that have blocked exits 70. Heat of the exhaust gas from the LPT 44 is dissipated as the exhaust gas travels between the adjacent channels and from the entrance side of the wall-flow ceramic filter structure 56G to the exit side.

Figure 10:
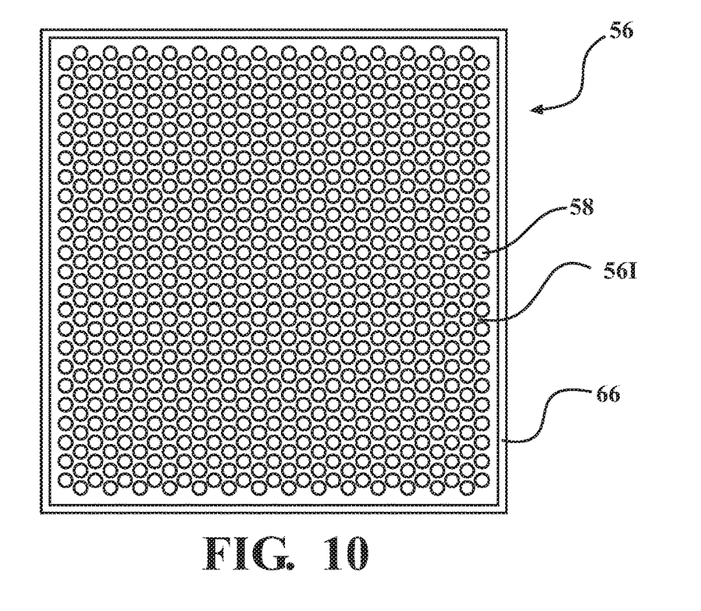
FIG. 10 is a close-up plan view of a flow-through ceramic filter embodiment of the pyrotechnic device shield shown in FIG. 1.

In an embodiment shown in FIG. 10, the mesh structure 56 may include a flow-through ceramic filter 56I mounted to the housing 50 via the ceramic structure holder or frame 66. The flow-through ceramic filter 56I is configured as a ceramic mesh with regularly spaced openings 58. Exhaust flows through the flow-through ceramic filter 56I from one end to another. The particulates 48 are filtered out of the exhaust gas due to the smaller size of the channel openings 58 as compared to the size of the particulates. Heat of the exhaust gas from the LPT 44 is dissipated as the exhaust gas travels from one side of the flow-through ceramic filter 56I to the other, thus protecting the component 12A from the heat. Although the channel openings 58 are depicted as having a circular shape, other shapes, for example square, rectangular, etc., are also envisioned.

Overall, in all the described embodiments of the mesh structure 56, when the LPT 44 is triggered or activated, and the pyrotechnic device 46 generates the force Fe directed to tension the lap belt 34 around the occupant, emitted particulates 48 are deflected and redirected by the shield 54 from impinging on the component 12A. Moreover, the shield 54 acts to dissipate the heat energy and the force Fp of the particulates 48 via the mesh structure 56. As indicated above, the disclosed embodiments of the shield 54 may be mounted to the housing 50 via a number of alternative means, such as adhesive bonding, attached via appropriate fasteners, such as hooks, screws, or bolts, or welded thereto.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A lap belt pretensioner for a lap belt configured to secure an occupant of a vehicle seat, the lap belt pretensioner being configured to pull and secure the lap belt around the occupant and comprising:
    a pyrotechnic device configured to generate a force directed to tension the lap belt around the occupant and emit an exhaust gas including particulates at high pressure and high temperature as a byproduct of the generated force;
    a housing configured to retain the pyrotechnic device and defining an exhaust passage configured to expel the exhaust gas from the lap belt pretensioner; and
    a shield arranged over the exhaust passage and configured to at least one of collect and deflect the emitted particulates and dissipate heat energy thereof.

2. The lap belt pretensioner of claim 1, wherein the shield includes a mesh structure having a plurality of openings configured to block the particulates from exiting the exhaust passage and configured to permit the emitted exhaust gas to escape the exhaust passage.

3. The lap belt pretensioner of claim 2, wherein the mesh structure is fixed to the housing.

4. The lap belt pretensioner of claim 2, wherein the mesh structure includes a compliant first mesh member fixed to the housing and a second rigid mesh member spaced apart from the first mesh member, and wherein the first mesh member is configured to block the emitted particulates and the second mesh member is configured to limit movement of the first mesh member away from the housing.

5. The lap belt pretensioner of claim 2, wherein the mesh structure is pivotably connected to the housing and configured to move under the pressure generated by the pyrotechnic device.

6. The lap belt pretensioner of claim 2, wherein the mesh structure is arranged on and connected to the housing and configured to detach under the pressure generated by the pyrotechnic device.

7. The lap belt pretensioner of claim 2, wherein the mesh structure is arranged on and fixed to the housing, and constructed from a shape-memory alloy configured to decrease a respective size of each of the plurality of openings in response to the heat energy of the particulates.

8. The lap belt pretensioner of claim 2, wherein the mesh structure is arranged on and fixed to the housing, and includes auxetic properties facilitating the mesh structure to extend away from the exhaust passage under the pressure generated by the pyrotechnic device while maintaining a respective size of each of the plurality of openings to capture the particulates.

9. The lap belt pretensioner of claim 2, wherein the mesh structure includes an open-cell ceramic foam filter mounted to the housing via a ceramic foam filter holder.

10. The lap belt pretensioner of claim 2, wherein the mesh structure includes one of a wall-flow ceramic structure and a flow-through ceramic structure mounted to the housing via a ceramic structure holder.

11. A vehicle comprising:
    a vehicle structure;
    a vehicle seat mounted to the vehicle structure; and
    a seatbelt system configured to secure an occupant of the vehicle in the vehicle seat, the seatbelt system having:
        a lap belt configured to secure the occupant in the vehicle seat; and
        a lap belt pretensioner configured to pull and secure the lap belt around the occupant, the lap belt pretensioner including:
            a pyrotechnic device configured to generate a force directed to tension the lap belt around the occupant and emit an exhaust gas including particulates at high pressure and high temperature as a byproduct of the generated force;
            a housing configured to retain the pyrotechnic device and defining an exhaust passage configured to expel the exhaust gas from the lap belt pretensioner; and
            a shield arranged over the exhaust passage and configured to at least one of collect and deflect the emitted particulates and dissipate heat energy thereof.

12. The vehicle of claim 11, wherein the shield includes a mesh structure having a plurality of openings configured to block the particulates from exiting the exhaust passage and configured to permit the emitted exhaust gas to escape the exhaust passage.

13. The vehicle of claim 12, wherein the mesh structure is fixed to the housing.

14. The vehicle of claim 12, wherein the mesh structure includes a compliant first mesh member fixed to the housing and a second rigid mesh member spaced apart from the first mesh member, and wherein the first mesh member is configured to block the emitted particulates and the second mesh member is configured to limit movement of the first mesh member away from the housing.

15. The vehicle of claim 12, wherein the mesh structure is pivotably connected to the housing and configured to move under the pressure generated by the pyrotechnic device.

16. The vehicle of claim 12, wherein the mesh structure is arranged on and connected to the housing and configured to detach under the pressure generated by the pyrotechnic device.

17. The vehicle of claim 12, wherein the mesh structure is arranged on and fixed to the housing, and constructed from a shape-memory alloy configured to decrease a respective size of each of the plurality of openings in response to the heat energy of the particulates.

18. The vehicle of claim 12, wherein the mesh structure is arranged on and fixed to the housing, and includes auxetic properties facilitating the mesh structure to extend away from the exhaust passage under the pressure generated by the pyrotechnic device while maintaining a respective size of each of the plurality of openings to capture the particulates.

19. The vehicle of claim 12, wherein the mesh structure includes an open-cell ceramic foam filter mounted to the housing via a ceramic foam filter holder.

20. The vehicle of claim 12, wherein the mesh structure includes one of a wall-flow ceramic structure and a flow-through ceramic structure mounted to the housing via a ceramic structure holder.

* * * * *